United States Patent
Hwang

(10) Patent No.: US 9,060,333 B2
(45) Date of Patent: Jun. 16, 2015

(54) WIRELESS COMMUNICATION SYSTEM AND TIME SYNCHRONIZATION METHOD THEREOF

(71) Applicant: Samsung Electronics Co., Ltd., Gyeonggi-do (KR)

(72) Inventor: Sungwook Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 306 days.

(21) Appl. No.: 13/713,884

(22) Filed: Dec. 13, 2012

(65) Prior Publication Data
US 2013/0154877 A1    Jun. 20, 2013

(30) Foreign Application Priority Data
Dec. 14, 2011  (KR) .................. 10-2011-0134200

(51) Int. Cl.
*G01S 19/39* (2010.01)
*H04W 56/00* (2009.01)

(52) U.S. Cl.
CPC ........ *H04W 56/0025* (2013.01); *H04W 56/006* (2013.01)

(58) Field of Classification Search
CPC .................. H04W 56/0025; H04W 56/006
See application file for complete search history.

(56) References Cited

U.S. PATENT DOCUMENTS

| 8,112,777 B2 * | 2/2012 | Kim et al. ................ 725/54 |
| 2005/0020279 A1 * | 1/2005 | Markhovsky et al. ..... 455/456.1 |
| 2006/0012476 A1 * | 1/2006 | Markhovsky et al. ... 340/539.32 |

FOREIGN PATENT DOCUMENTS

EP    2 579 678 A1 * 10/2013 ............ H04W 88/08

* cited by examiner

*Primary Examiner* — Bobbak Safaipour
(74) *Attorney, Agent, or Firm* — The Farrell Law Firm, P.C.

(57) ABSTRACT

A method for acquiring and maintaining Global Positioning System (GPS) synchronization is provided for use in the wireless communication system. The method includes receiving, by at least one Global Positioning System (GPS) receiver, GPS absolute time information and GPS information from at least one GPS satellite; transmitting, from the at least one GPS receiver, to a base station, reference time information generated based on the GPS absolute time information; and generating, by the base station, base station absolute time information based on the reference time information.

18 Claims, 9 Drawing Sheets

WIRELESS COMMUNICATION SYSTEM AND TIME SYNCHRONIZATION METHOD THEREOF

PRIORITY

This application claims priority under 35 U.S.C. §119(a) to a Korean patent application filed on Dec. 14, 2011 in the Korean Intellectual Property Office and assigned Serial No. 10-2011-0134200, the entire content of which is incorporated herein by reference.

BACKGROUND OF THE INVENTION

1. Field of the Invention

The present invention relates generally to a wireless communication system and time synchronization method thereof and, in particular, to a wireless communication system including base stations and Remote Radio Headers (RRHs) equipped with Global Positioning System (GPS) receivers and a method for acquiring and maintaining GPS synchronization in the wireless communication system.

2. Description of the Related Art

A base station uses GPS signals received from GPS satellites in order to acquire synchronization with a network. The GPS signal strength is comparable to the visible strength of a fog light of a vehicle from a distance of about 16000 km, under the assumption that the surface of the earth is flat. Accordingly, if the line of sight between a GPS receiver and the GPS satellite is not guaranteed securely, the GPS receiver is likely to fail in receiving the GPS signal. Since the GPS signal is very weak, if other strong signals on similar frequency bands exist, the GPS signal receiver is also likely to fail receiving the GPS signal.

If the GPS receiver fails to interpret the GPS signal correctly, the base station is also likely to malfunction or operate in limited capability. In a worst-case scenario, the GPS signal reception failure may result in a termination of communication. Due to the diversification of radio technologies, the GPS frequency band is being increasingly overlapped with other communication or broadcast system frequency bands. This overlapping makes it even more difficult to secure reliable GPS signal reception environment, and, as this overlapping accelerates, it is expected the situation will worsen even more rapidly.

In order to minimize the damage caused by GPS signal reception performance degradation, many studies are being conducted. One example of a method for reducing such damage is to integrate the GPS receiver in a digital block of the base station and use a high accuracy local oscillator in order to provide the GPS receiver with a holdover function.

In the wireless communication system, a network synchronization block equipped with a GPS receiver is very important in view of absolute time synchronization of the entire network. Accordingly, the base station is provided with at least two network synchronization blocks responsible for the same function at specific parts with the application of clock duplication. Since each of the network synchronization blocks have its own respective GPS antennas, such a configuration causes a tradeoff between system capacity and installation space and increases cost.

Although the clock duplication is used, it is necessary to use the high accuracy local oscillator in order to compensate for GPS signal loss caused by environmental change and device malfunction (i.e. for providing a holdover function). In such applications a high accuracy local oscillator is a very sensitive and expensive device. Recent high accuracy local oscillators are small enough for such applications, but there is also a preference for special oscillators that overcome ambient temperature sensitivity. Also, current systems implemented based on the local oscillator are limited in that the use of relatively large and expensive local oscillators causes spatial restrictions and increases manufacturing costs. Therefore, there is a need for an improved time synchronization method for a wireless communication system.

SUMMARY OF THE INVENTION

The present invention has been made in an effort to address the above-described problems and provide at least the advantages described below. According to an aspect of the present invention, a time synchronization method that is capable of improving the time synchronization performance by enhancing GPS signal reception with multiple receivers is provided.

In accordance with an aspect of the present invention, a time synchronization method of a wireless communication system is provided. The method includes receiving, by at least one Global Positioning System (GPS) receiver, GPS absolute time information and GPS information from at least one GPS satellite; transmitting, from the at least one GPS receiver, to a base station, reference time information generated based on the GPS absolute time information; and generating, by the base station, base station absolute time information based on the reference time information.

In accordance with another aspect of the present invention, a wireless communication system is provided. The wireless communication system includes at least one Global Positioning System (GPS) receiver for receiving GPS absolute time information and GPS information from at least one GPS satellite, generating reference time information based on the GPS absolute time information, and transmitting the reference time information to a base station; and the base station for generating base station absolute time information based on the reference time information received from the at least one GPS receiver.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Embodiments of the present invention are described as follows with reference to the accompanying drawings in detail. Detailed descriptions of well-known functions and structures incorporated herein may be omitted to avoid obscuring the subject matter of the present invention. Further, terms used herein are defined in consideration of the functionality of the present invention, and may vary according to the intention of a user or an operator, usage, etc. Therefore, the definitions of terms should be made on the basis of the overall content of the present specification.

Figure 1:
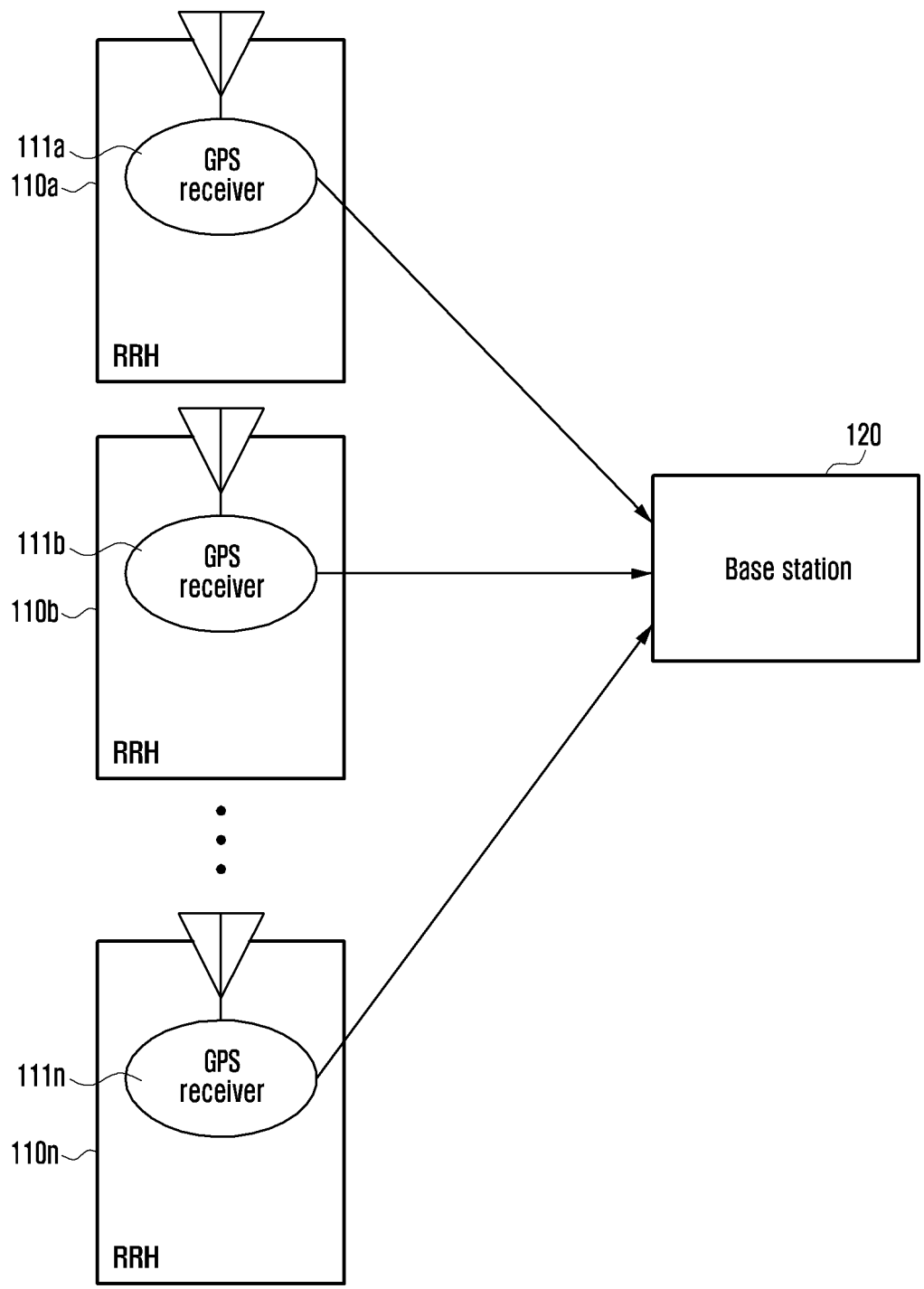
FIG. 1 is a diagram illustrating a wireless communication system for receiving a GPS signal according to an embodiment of the present invention.

FIG. 1 is a diagram illustrating a wireless communication system for receiving a GPS signal according to an embodiment of the present invention.

Referring to FIG. 1, the wireless communication system includes a plurality of Remote Radio Heads (RRHs) 110a, 110b, . . . 110n each having at least one respective GPS receiver 111a, 111b, . . . 111c, and a base station 120. Hereinafter, the terms "RRH' and "GPS receiver" are used interchangeably.

The plurality of GPS receivers are integrated into the respective RRHs 110a, 110b, . . . 110n, which are connected in a cascaded manner. The cascade connection connects the RRHs such that, the RRHs operate in sequence one after another. For example, if the first GPS receiver 110a receives a GPS signal, the second GPS receiver 110b receives the GPS signal after the first GPS receiver 110a, and so forth, until an n-th GPS receiver 110n receives the GPS signal. Alternatively, the RRHs having GPS receivers may operate independently.

The RRHs 110a, 110b, . . . 110n are connected to the base station 120 through fiber optic cables using Common Public Radio Interface (CPRI) protocol to expand the service area of the base station 120. According to an embodiment of the present invention, the RRHs 110a, 110b, and 110c can be installed separately from the base station and transmit the GPS information received from the GPS satellite to the base station using the CPRI protocol.

The plurality of GPS receivers 110a, 110b, . . . 110n are each provided with a dedicated GPS antenna for receiving the GPS signal from the GPS satellite. The plurality of GPS receivers 110a, 110b, . . . 110n interprets the GPS signal received from the GPS satellite through the GPS antenna to acquire the absolute time information as reference clock and GPS time information. Here, the plurality of GPS receivers 110a, 110b, . . . 110n is capable of checking 1 Pulse Per Second (PPS) (G_1PPS) as absolute GPS time information, GPS time information (i.e., Time of Day (TOD)), and GPS receiver status information in the GPS signal received from the GPS satellite. According to an embodiment of the present invention, the plurality of GPS receivers 110a, 110b, . . . 110n is capable of sending the base station 120 the time information acquired by synchronizing the phases of the GPS_1 Pulse Per Second (G_1PPS) as the absolute time information received from the GPS satellite and the Control_1 Pulse Per Second (C_1PSS) as the base station absolute time information received from the base station 120.

The base station 120 includes a network synchronization unit (not shown) for processing the reference clock and time information received from the plurality of GPS receivers 110a, 110b, . . . 110n. The base station 120 also includes a high accuracy local oscillator (not shown) to be used when the GPS signal is lost. According to an embodiment of the present invention, the base station 120 checks the GPS information and the time information received from the plurality of GPS receivers 110a, 110b, . . . 110n. The base station 120 compares the received GPS information and time information. The base station generates base station absolute time information using the GPS information and time information having an optimal value from among the received GPS information. Herein, the optimal value refers to the highest validity or the highest value from among the values of the GPS information received from the plurality of GPS receivers.

At this time, the base station 120 checks the GPS information having the optimal value from among the received GPS information and synchronized time information. The base station 120 selects the GPS information having the largest number of GPS satellites as the optimal GPS information. Next, the base station 120 selects the optimal GPS information based on the validity of TOD. The base station 120 also selects the GPS information based on the validity of the synchronized time information. If the GPS information having the optimal value is checked, the base station 120 generates the base station absolute time information using the time information transmitted along with the corresponding GPS information.

The absolute time information generated as described above can be used for data communication between the terminal and other base station and transmitted to the RRH 110a, 110b, and 110c having the GPS receivers for use in synchronization with the absolute time information received from the GPS satellite.

Figure 2:
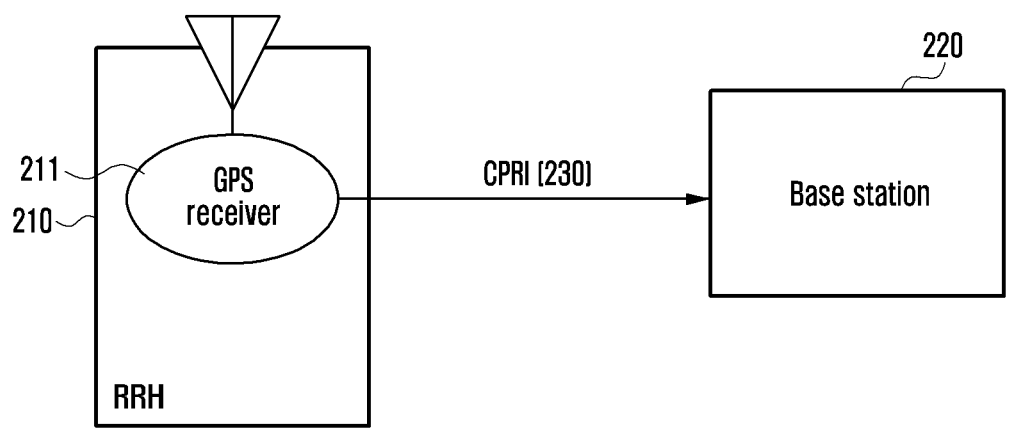
FIG. 2 is a diagram illustrating a communication link between a GPS receiver and a base station according to an embodiment of the present invention.

FIG. 2 is a diagram illustrating a communication link between a GPS receiver and a base station according to an embodiment of the present invention.

Referring to FIG. 2, RRH 210, which includes a GPS receiver 211 is connected to a base station 220 through a CPRI link 230. RRH 210 operates in a manner similar to that of the RRHs 110a, 110b, . . . 110n shown and described with reference to FIG. 1. CPRI is the specification for a Radio Equipment Control (REC) used to establish a connection between specific areas represented by Radio Equipment (RE) or the RRHs. The CPRI defines IQ sample data and synchronization information for use in communication between REC and RE or between REs.

The base station 220, which operates as an REC and the RRH 210, which operates as an RE, communicate data through the CPRI link 230. In order to accomplish this, the base station 220 and the RRH 210 are provided with a CPRI interface.

Figure 3:
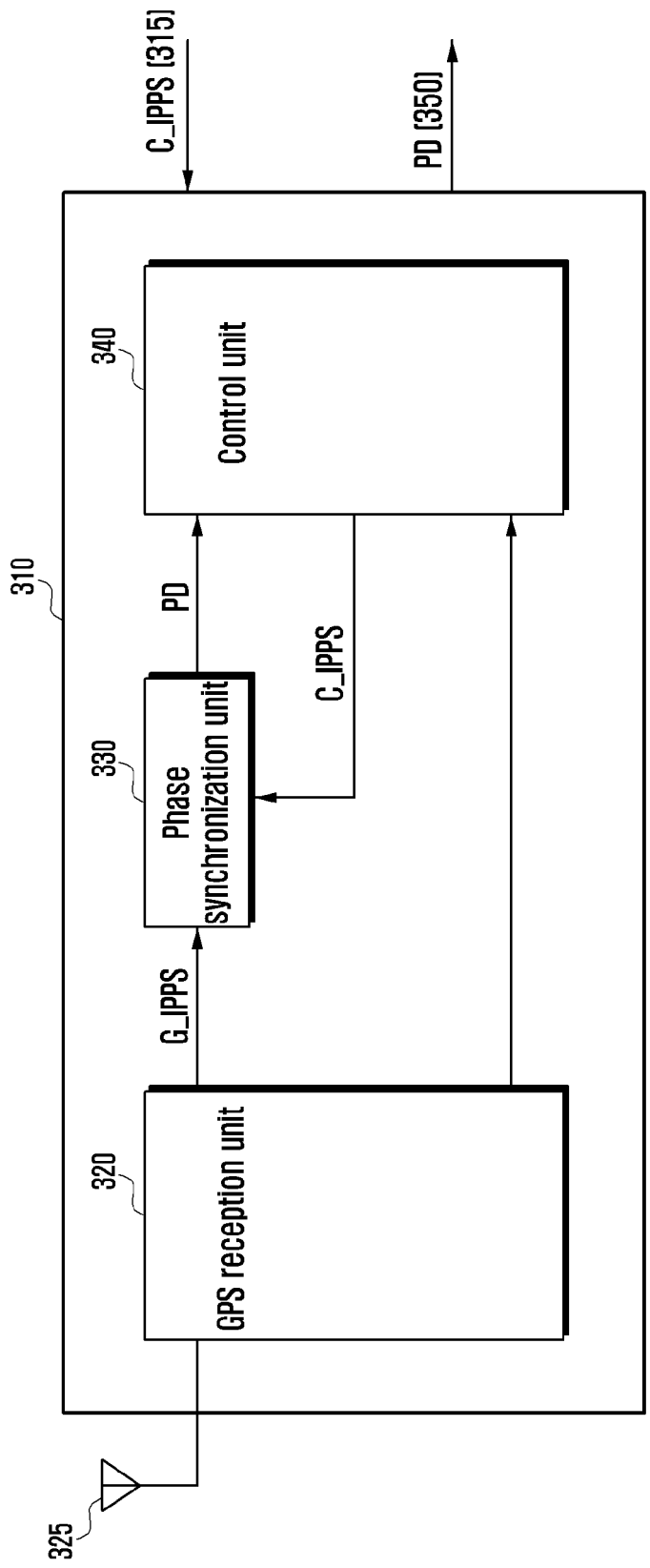
FIG. 3 is a block diagram illustrating a configuration of an RRH including a GPS receiver according to an embodiment of the present invention.

FIG. 3 is a block diagram illustrating a configuration of an RRH including a GPS receiver according to an embodiment of the present invention.

Referring to FIG. 3, the RRH 310 includes a GPS reception unit 320, a phase synchronization unit 330, and a control unit 340.

The GPS reception unit 320 is provided with a GPS antenna 325 for receiving GPS information transmitted by GPS satellites. The GPS reception unit 320 sends GPS absolute time information (G_1PPS), the GPS Time of Day (TOD), and GPS reception unit status information to the control unit 340. The control unit 340 may include a CPRI interface (not shown).

The phase synchronization unit 330 synchronizes C_1PPS 315 as the base station absolute time information received from the base station and the G_1PPS received from the GPS satellite to generate the time information. A procedure for generating the time information through phase synchronization is described hereinafter in more detail.

The base station sets a Basic Frame Number (BFN) of the CPRI synchronized by a certain C_1PPS to '0' and sends the CPRI frame to the RRH 310. Upon receipt of the CPRI frame, the control unit 340 of the RRH 310 checks the BFN value of the CPRI frame and, if the BFN is set to 0, generates a clock pulse. The clock pulse is the C_1PPS transmitted by the base station.

The phase synchronization unit 330 compares the phase of the C-1PPS (Compensation 1PPS) received from the base station through the CPRI interface of the control unit 340 with the phase of the G_1PPS (GPS 1PPS) received from the GPS satellite through the GPS antenna to synchronize the time information. More specifically, the phase synchronization unit 330 generates Phase Detect (PD) value as the synchronization time information. Next, the phase synchronization unit 330 sends the generated PD value to the control unit 340.

The control unit 340 sends the TOD, GPS receiver status information, and the PD value 350 received from the GPS reception unit to the base station through the CPRI interface.

More specifically, the GPS receiver checks the absolute time information of the GPS information received from the GPS satellite. The GPS receiver acquires synchronization of the C_1PPS as the base station absolute time information received from the base station by referencing the checked absolute time information to generate the time information. Finally, the GPS receiver sends the base station the GPS information received from the GPS satellite and the synchronized time information.

Figure 4:
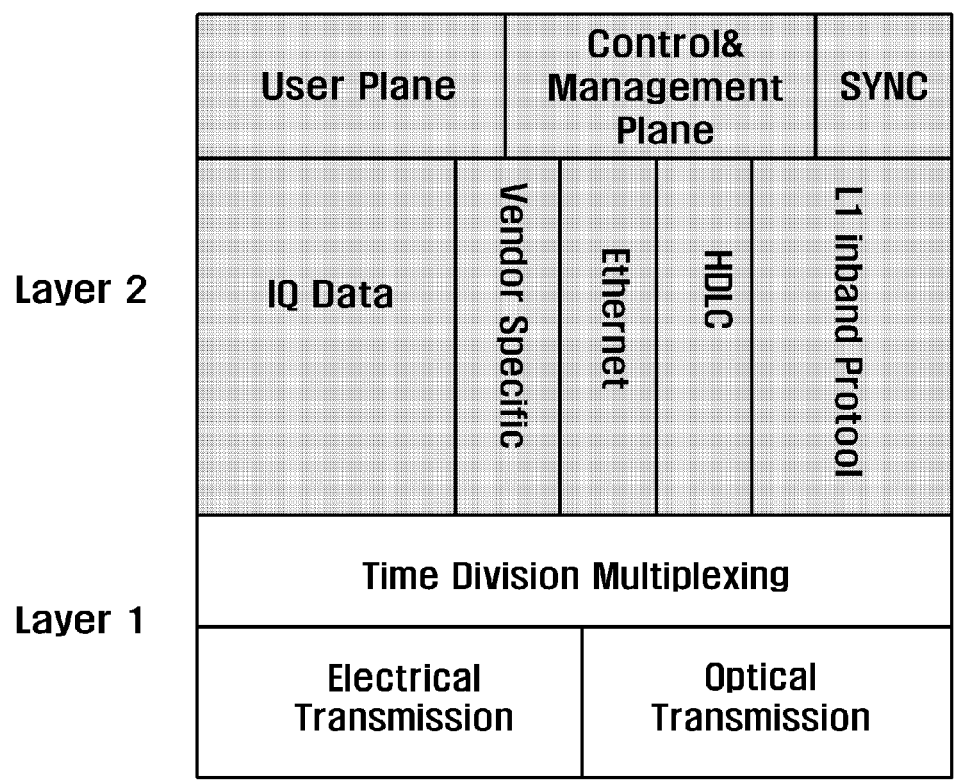
FIG. 4 is a diagram illustrating a format of a CPRI protocol frame for use in the time synchronization method according to an embodiment of the present invention.

FIG. 4 is a diagram illustrating a format of a CPRI protocol frame for use in a time synchronization method according to an embodiment of the present invention.

Referring to FIG. 4, the CPRI defines two layer protocols: layer 1 and layer 2. The CPRI protocol supports the IQ data for User Plane Data transfer, Synchronization for frame and time alignment, L1 in-band Protocol for basic layer 1 link configuration and primary information transfer, and Control and Management (C&M) data for control and management information. According to the CPRI protocol, the C&M Data and Synchronization information can be defined by the user. The GPS receiver transmits a Phase Detect (PD) value as synchronized time information for Phase Locked Loop (PLL) control in the base station control block and the GPS time information to the base station using the Vendor specific region allowing for the user's definition in the CPRI frame.

Figure 5:
FIG. 5 is a diagram illustrating a structure of a CPRI hyper frame according to an embodiment of the present invention.
Figure 6:
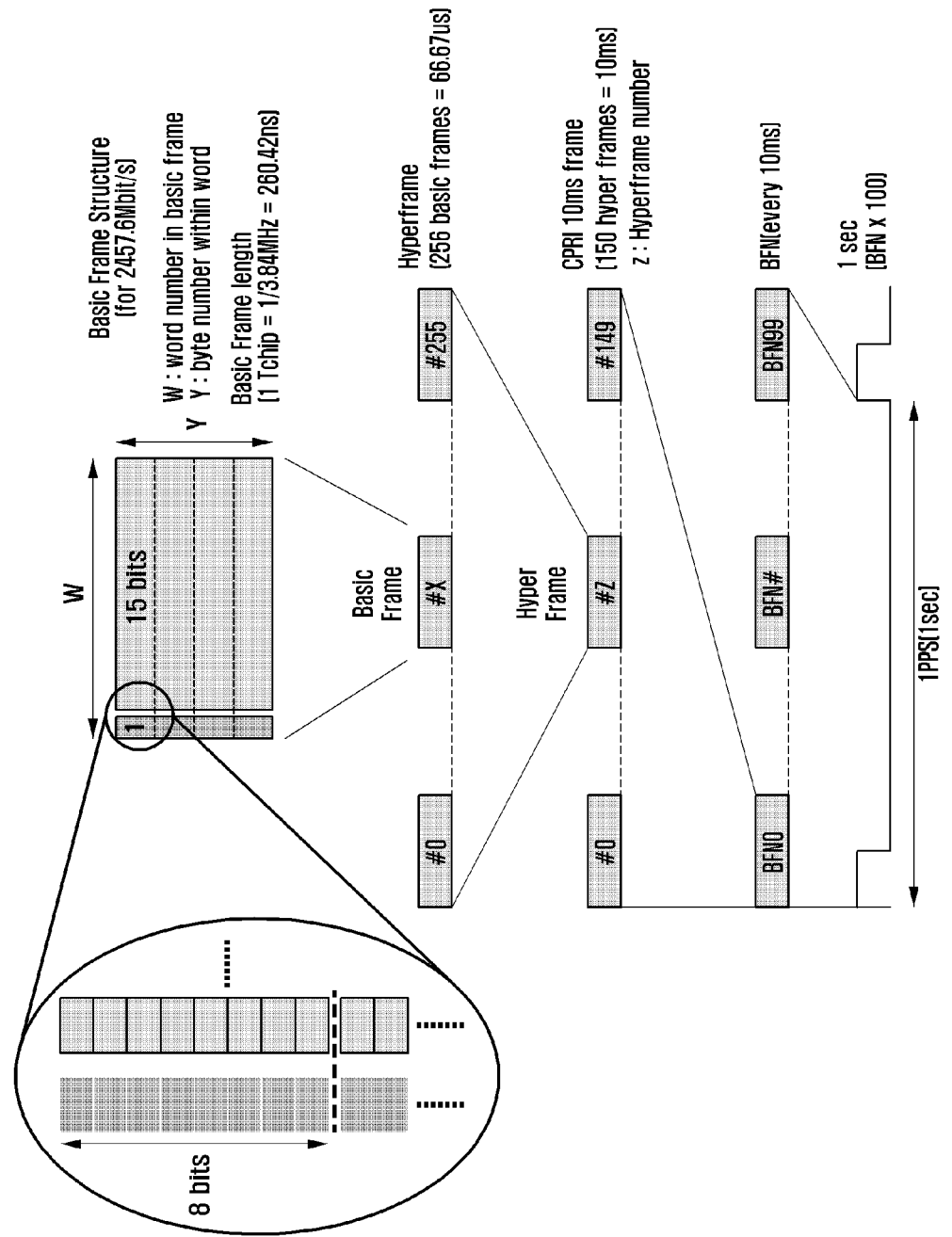
FIG. 6 is a diagram illustrating a 1PPS synchronization mechanism with the CPRI frame according to an embodiment of the present invention.

FIGS. 5 and 6 are diagrams illustrating a CPRI frame structure according to a method for synchronizing 1PPS using the CPRI frame according to an embodiment of the present invention. Herein, a detailed description of features that are identical with the CPRI specification is omitted in order to avoid obscuring the subject mater of the present invention.

FIG. 5 is a diagram illustrating a structure of a CPRI hyper frame according to an embodiment of the present invention.

Referring to FIG. 5, a CPRI frame includes 150 hyper frames and each hyper frame includes 256 basic frames. Each basic frame includes a control code.

The 255 control words of a hyper frame are classified into 4 groups to form 64 sub-channels. Some of the 64 sub-channels can be allocated for a vendor specific region 510. Here, the vendor specific region 510 is a region that can be defined by the user. The GPS receiver transmits, to the base station, a Phase Detect (PD) value as synchronized time information and GPS time information for clock PLL control of the base station using the vendor specific region 510.

FIG. 6 is a diagram illustrating a 1PPS synchronization mechanism with a CPRI frame according to an embodiment of the present invention.

Referring to FIG. 6, a CPRI standard basic frame structure includes a 15-bit basic IQ data (baseband signal) and a basic header in view of 1 chip (3.84 Mpbps). The IQ data is transmitted with two mapping frames of the basic frame to fit for the CPRI specification. Each of 150 hyper frames includes to 256 basic frames. The 150 hyper frames are assigned one of 100 BFNs. The 100 BFNs are used for identifying 1PPS.

Figure 7:
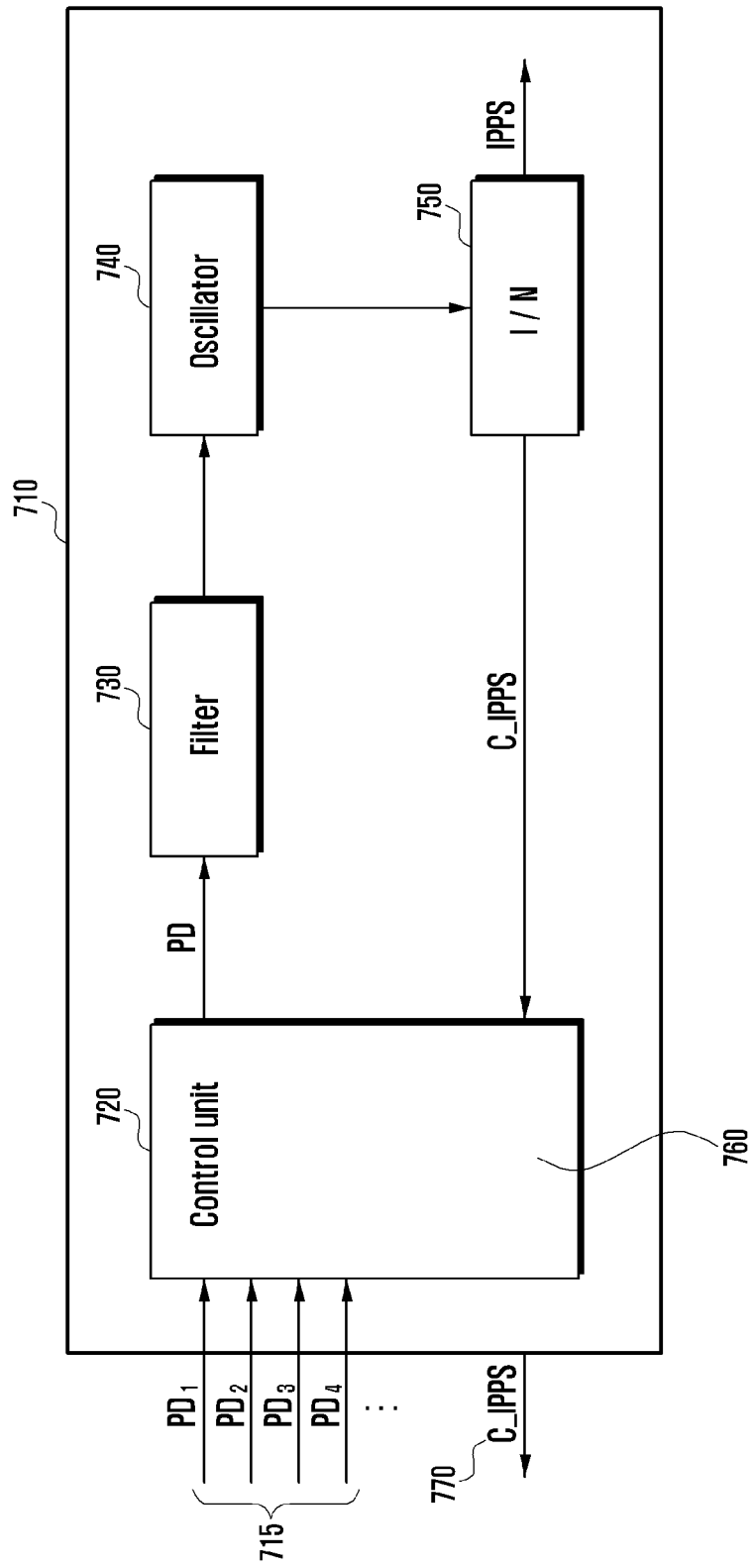
FIG. 7 is a block diagram illustrating a configuration of a base station according to an embodiment of the present invention.

FIG. 7 is a block diagram illustrating a configuration of a base station according to an embodiment of the present invention.

Referring to FIG. 7, a base station 710 includes a control unit 720, a filter 730, and an oscillator 740.

The control unit 720 receives GPS information from a plurality of GPS receivers (not shown). More specifically, the control unit 720 recovers PD1, PD2, PD3, PD4, ... 715 as GPS information and TOD from the CPRI frame. The control unit 720 transfers the recovered PD values and TOD to the filter 730. At this time, the control unit 720 transfers only the GPS information having the maximum value among the received GPS information. More specifically, the control unit 720 selects the GPS information having the largest number of GPS satellites from among the GPS information transmitted by the GPS receivers. Next, the control unit 720 selects the GPS information based on the validity of the TOD. The control unit 720 also selects the GPS information by checking the validity of the synchronized time information.

The filter 730 performs filtering on the PD value and transfers the filtered value to the oscillator 740. The PD value recovered by the control unit 720 is used to control the oscillator (OSC) 740. The control unit 720 checks GPS receiver status information as the GPS information is received from the GPS receiver. At this time, the GPS receiver status information includes the satellite number (i.e., the number of satellites) and signal strength. The control unit 720 analyzes the GPS receiver status information received from the GPS receiver to determine whether the received GPS information is normal.

The base station 710 generates the base station absolute time information by compensating the synchronized time information received from the GPS receiver through the oscillator 740.

The absolute time information 1PPS is generated by dividing the information by a number of the OSC frequencies. The absolute time information of 1PPS generated in this manner is used as the reference clock of the control block of the base station 710. The 1PPS is also simultaneously sent to the GPS receiver as C_1PPS 750. The phases of the G_1PPS and C_1PPS are synchronized by the phase synchronizer of the GPS receiver to generate the PD value.

Figure 8:
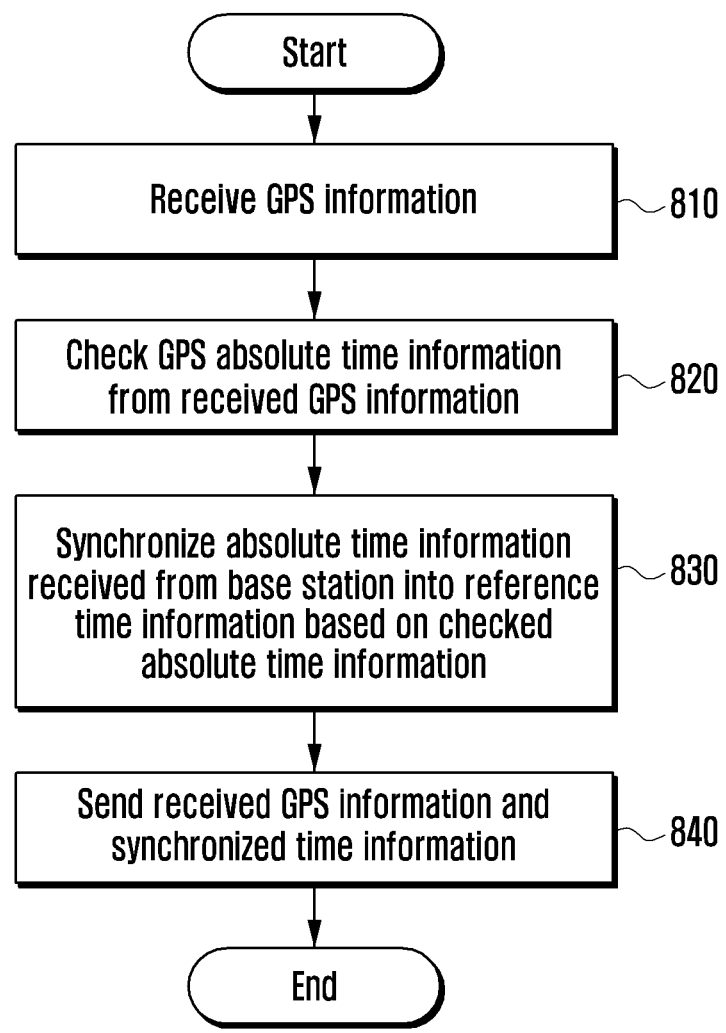
FIG. 8 is a flowchart illustrating a procedure performed by a GPS receiver in an absolute time synchronization method according to an embodiment of the present invention.

FIG. 8 is a flowchart illustrating a procedure of a GPS receiver in an absolute time synchronization method according to an embodiment of the present invention.

Referring to FIG. 8, a GPS receiver receives GPS information from GPS satellites, at step 810. The GPS information received from each GPS satellite includes a satellite number, GPS signal strength, and absolute time information of 1PPS. Next, the GPS receiver checks the absolute time information extracted from the received GPS signal, at step 820. Here, the absolute time information received from the GPS satellite is referred to as G_1PPS.

The phase synchronizer of an RRH including the GPS receiver synchronizes the C_1PPS as the base station absolute time information received from the base station with the checked absolute time information, at step 830. More specifically, the phase synchronization unit of the RRH including the GPS receiver synchronizes the phase of the C_1PPS with that of the G_1PPS. Finally, the RRH including the GPS receiver sends the received GPS information and the synchronized time information to the base station, at step 840.

Figure 9:
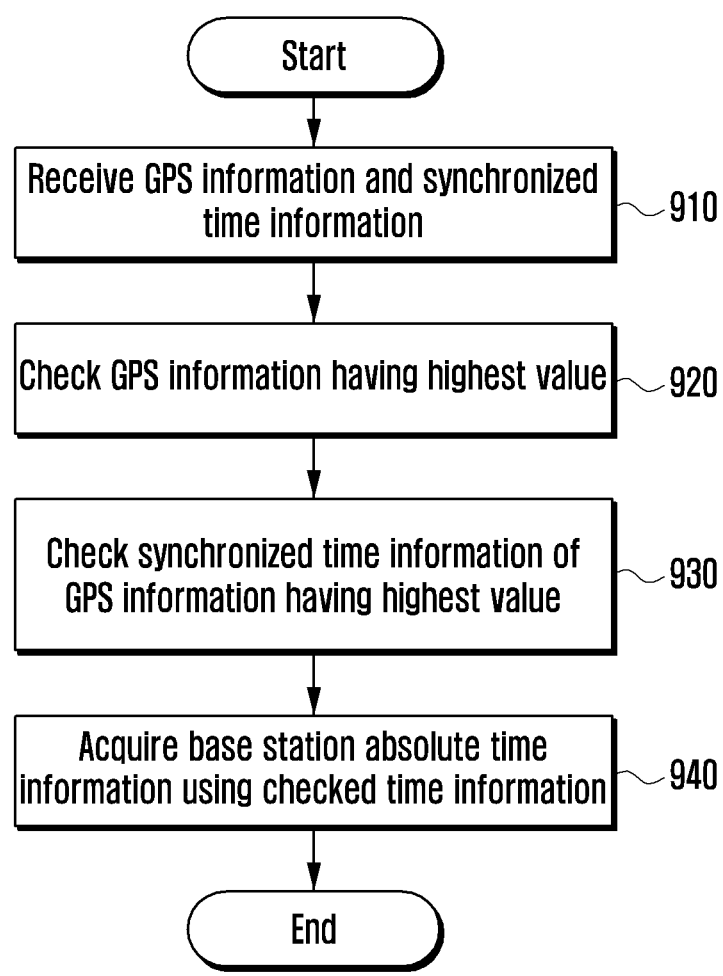
FIG. 9 is a flowchart illustrating a procedure performed by a base station according in an absolute time synchronization method according to an embodiment of the present invention.

FIG. 9 is a flowchart illustrating a procedure performed by a base station in an absolute time synchronization method according to an embodiment of the present invention.

Referring to FIG. 9, a base station receives GPS information and synchronized time information from at least one RRH including a GPS receiver, at step 910. The GPS information includes a number of satellites transmitted the GPS signal, GPS signal strength, Time of Day (TOD), reception status of the GPS receiver, etc. Next, the base station checks the GPS information having the optimal value among the received GPS information and synchronized time information. At this time, the base station may select the GPS information having the largest number of GPS satellites. The base station may also select the GPS information based on the validity of the TOD. The base station may also select the GPS information by checking the validity of the synchronized time information.

The base station checks the synchronized time information of the GPS information having the optimal value, at step 930. Next, the base station calculates the 1PPS as the absolute time information of the base station by referencing the checked time information, at step 940. Although not shown in FIG. 9, the calculated 1PPS is sent to the phase synchronization unit of the RRH including the GPS receiver so as to be used as a reference value for phase synchronization of the G_1PPS as the absolute time information received from the GPS satellite.

As described above, the GPS receiver is separated from the base station and integrated into an RRH installed adjacent to the base station antenna. In this configuration, the GPS signal can be received by the separated GPS receiver and a control block (hereinafter, interchangeably used with the terms 'DU block', 'baseband control block', 'Radio Equipment Controller' and 'REC) of the base station.

As described above, a time synchronization method according to an embodiment of the present invention uses spatially distributed multiple GPS receivers to receive the GPS signal stably, resulting in improvement of network synchronization performance in a wireless communication system.

Also, the time synchronization method according to an embodiment of the present invention receives the GPS signals via RRHs equipped with GPS receivers that are spatially distributed, thereby overcoming the problems caused by the reception failure of the GPS signals weaken by physical obstacle or interference of similar bandwidth system signals.

Also, the time synchronization method according to embodiments of the present invention improves the reliability of the clock signal by referencing the best GPS information selected from among the GPS information received by multiple GPS receivers located at different positions, thereby reducing the number of holdover operations caused by GPS signal reception failure remarkably.

Also, the time synchronization method according to embodiments of the present invention reduces the dependency on expensive high accuracy oscillators by using GPS receivers installed at a plurality of RRHs.

Also, the time synchronization method according to embodiments of the present invention reduces costly facility improvements for GPS reception environment by utilizing RRHs.

Furthermore, the time synchronization method according to embodiments of the present invention reduces the cost of GPS reception enhancement by using the cost-effective GPS antenna and GPS receiver installation at RRHs of the base station.

Although embodiments of the present invention have been described in detail hereinabove with specific terminology, this is for the purpose of describing particular embodiments only and not intended to be limiting of the invention. While particular embodiments of the present invention have been illustrated and described, it will be apparent to those skilled in the art that various other changes and modifications can be made without departing from the spirit and scope of the invention as defined by the appended claims and their equivalents.

What is claimed is:

1. A time synchronization method of a radio equipment including at least one Global Positioning System (GPS) receiver of a wireless communication system, the method comprising:
   receiving GPS absolute time information and GPS information from at least one GPS satellite;
   receiving base station time information from a base station;
   generating a reference time information based on the GPS absolute time information and the base station time information; and
   transmitting the reference time information to the base station,
   wherein the base station time information is generated based on GPS information having an optimal value transmitted to the base station.

2. The method of claim 1, wherein generating the reference time information comprises synchronizing the base station time information received from the base station with the GPS absolute time information.

3. The method of claim 1, wherein the radio equipment including the at least one GPS receiver is connected with the base station using a Common Public Radio Interface (CPRI) link.

4. The method of claim 3, wherein transmitting the reference time information comprises transmitting the reference time information and the GPS information in a vendor specific region of a CPRI frame, the region being configurable by a user.

5. The method of claim 4, wherein the GPS information comprises at least one of GPS Time Of Day (TOD) information and GPS receiver status information.

6. A time synchronization method of a base station of a wireless communication system, comprising:
   receiving reference time information and Global Positioning System (GPS) information from a radio equipment including at least one GPS receiver;
   generating base station time information based on GPS information having an optimal value as a result of a comparison of the received GPS information; and
   transmitting the base station time information to the radio equipment,
   wherein the reference time information is generated based on GPS absolute time information transmitted from at least one GPS satellite.

7. The method of claim 6, wherein generating the base station time information comprises:

checking the GPS information received from the radio equipment including the at least one GPS receiver; and
checking the received reference time information along with GPS information having an optimal value as a result of a comparison of the checked GPS information.

8. The method of claim 6, wherein the base station is connected with the radio equipment including the at least one GPS receiver using a Common Public Radio Interface (CPRI) link.

9. The method of claim 6, wherein the GPS information comprises at least one of GPS Time Of Day (TOD) information and GPS receiver status information.

10. A radio equipment including at least one Global Positioning System (GPS) receiver for time synchronization in a wireless communication system, the radio equipment comprising:
 The GPS receiver configured to receive information regarding the GPS;
 a transceiver configured to receive and to transmit information; and
 a controller configured to control to receive GPS absolute time information and GPS information from at least one GPS satellite, to receive base station time information from a base station, to generate reference time information based on the GPS absolute time information, and to transmit the reference time information to the base station,
 wherein the base station time information is generated based on GPS information having an optimal value transmitted to the base station.

11. The radio equipment of clam 10, wherein the controller is further configured to synchronize base station time information received from the base station with the GPS absolute time information.

12. The radio equipment of clam 10, wherein the radio equipment is connected with the base station using a Common Public Radio Interface (CPRI) link.

13. The radio equipment of claim 10, the controller is further configured to transmit the reference time information and the GPS information in a vendor specific region of a CPRI frame, the region being configurable by a user.

14. The radio equipment of claim 10, wherein the GPS information comprises at least one of GPS Time Of Day (TOD) information and GPS receiver status information.

15. A base station for time synchronization in a wireless communication system, the base station comprising:
 a transceiver configured to receive and to transmit information;
 a controller configured to receive reference time information and Global Positioning System (GPS) information from a radio equipment including at least one GPS receiver, to generate base station time information based on GPS information having an optimal value as a result of a comparison of the received GPS information, and to transmit the base station time information to the radio equipment,
 wherein the reference time information is generated based on GPS absolute time information transmitted from at least one GPS satellite.

16. The base station of claim 15, wherein the controller is further configured to check the GPS information received from the radio equipment including the at least one GPS receiver, to check the received reference time information along with GPS information having an optimal value as a result of a comparison of the checked GPS information.

17. The base station of claim 15, wherein the base station is connected with the radio equipment including the at least one GPS receiver using a Common Public Radio Interface (CPRI) link.

18. The base station of claim 15, wherein the GPS information comprises at least one of GPS Time Of Day (TOD) information and GPS receiver status information.

* * * * *